United States Patent [19]

Dandona et al.

[11] Patent Number: 4,689,281
[45] Date of Patent: Aug. 25, 1987

[54] STORAGE BATTERY VENT CAP

[75] Inventors: Amar S. Dandona; Rex E. Luzader, both of Wyomissing, Pa.

[73] Assignee: General Battery Corporation, Reading, Pa.

[21] Appl. No.: 840,396

[22] Filed: Mar. 17, 1986

[51] Int. Cl.⁴ .............................................. H01M 2/12
[52] U.S. Cl. ........................................................ 429/89
[58] Field of Search ......................... 429/89, 87, 88, 82, 429/72, 53

[56] References Cited

U.S. PATENT DOCUMENTS

| | | | |
|---|---|---|---|
| 3,108,911 | 10/1963 | Miller | 429/89 |
| 3,284,244 | 11/1966 | Lucas | 429/87 |
| 3,992,226 | 11/1976 | Godshalk | 429/89 |
| 4,113,925 | 9/1978 | Kohler et al. | 429/78 |
| 4,315,058 | 2/1982 | Schwendener et al. | 429/89 X |
| 4,317,868 | 3/1982 | Spiegelberg | 429/82 |
| 4,517,262 | 5/1985 | Beidler | 429/87 |

Primary Examiner—Anthony Skapars
Attorney, Agent, or Firm—Benasutti and Murray

[57] ABSTRACT

A vent cap for enclosing filler openings of a storage battery comprises a base terminating at a ring including a generally U-shaped channel and a cover, the periphery of which engages the channel of the base. The periphery of the cover is provided with an essentially planar face having a chamfered termination and a plurality of circumferentially spaced, secant-shaped portions formed therein. The inner and outer faces of the cover are provided with relieved portions adjacent to the secant-shaped portions formed in the cover's periphery. The secant-shaped portions formed in the periphery of the cover and the relieved portions formed in the inner and outer faces of the cover cooperate with the U-shaped channel to develop a series of apertures between the base and cover. The cover has a downwardly depending central stem member having depending therefrom three baffle means each spaced one from the other and projecting outwardly perpendicularly from the stem member, with the uppermost baffle means projecting outwardly a greater distance than that of the other two and having a top surface which slopes downwardly from said stem member. Each baffle means has a diameter of from about 95% to about 97% of the interior diameter of the base wherein each respective baffle means resides.

17 Claims, 7 Drawing Figures

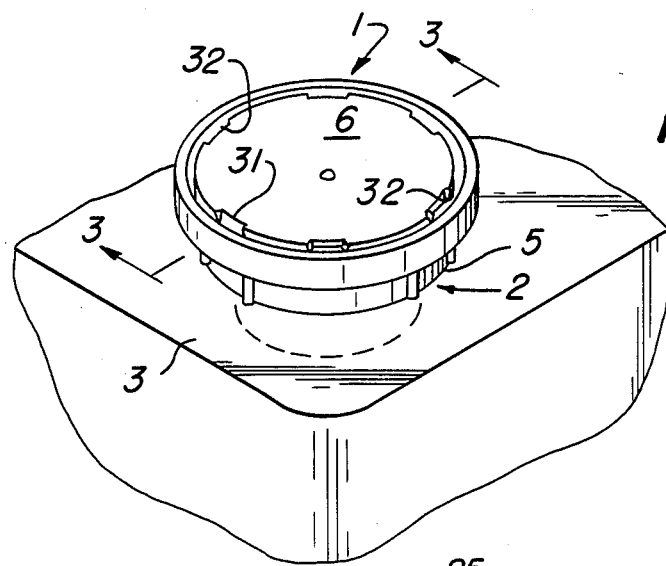
FIG. 1
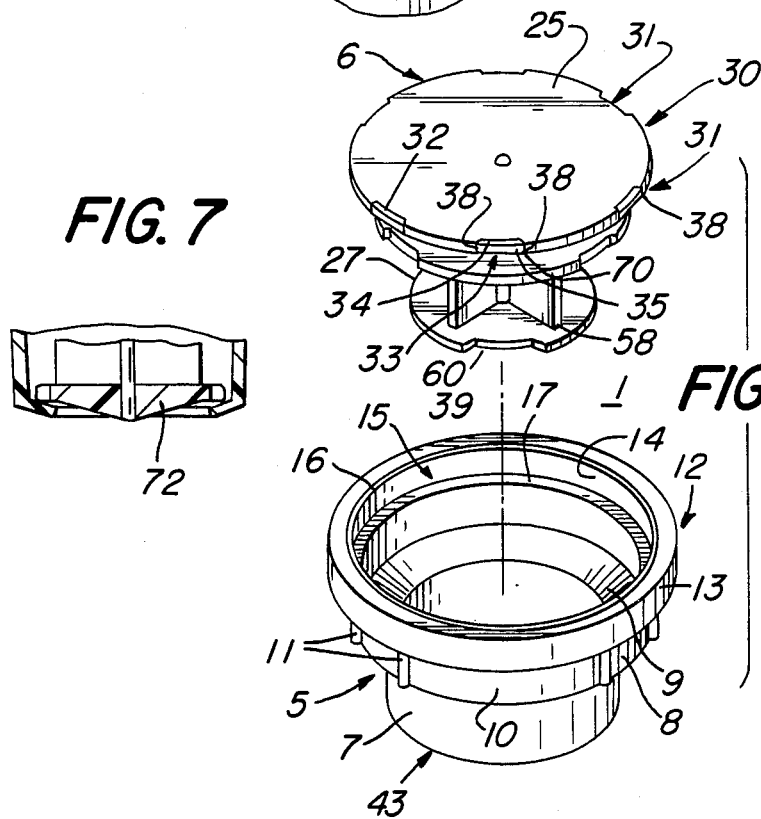
FIG. 7
FIG. 2

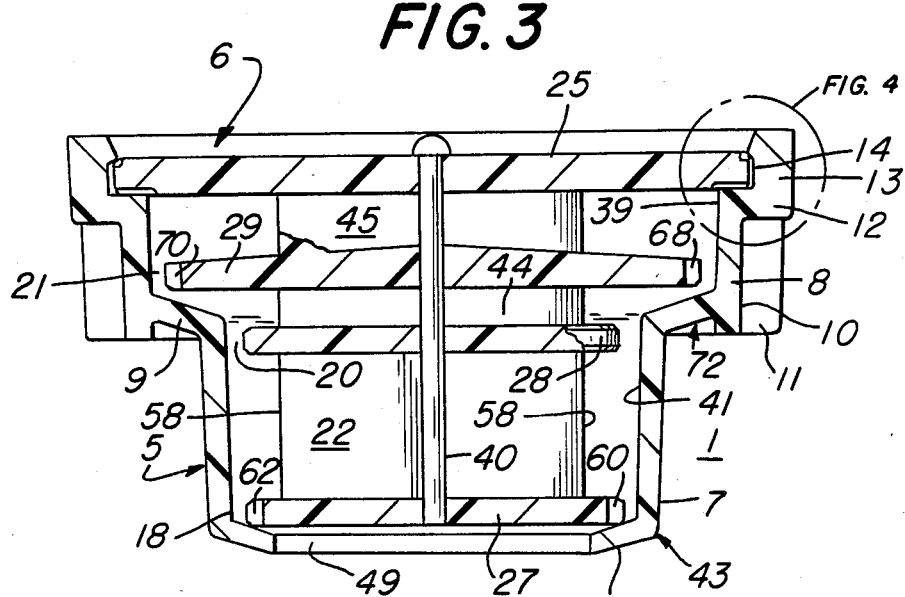
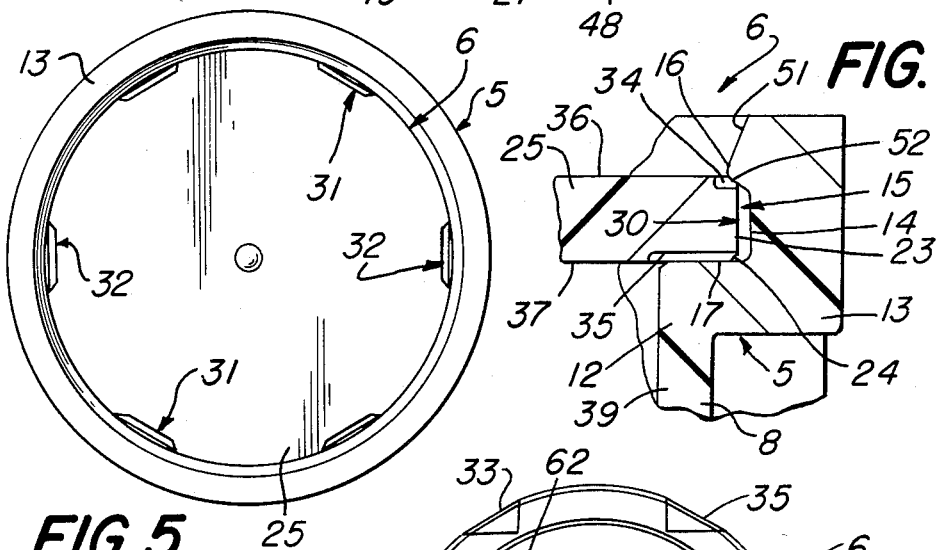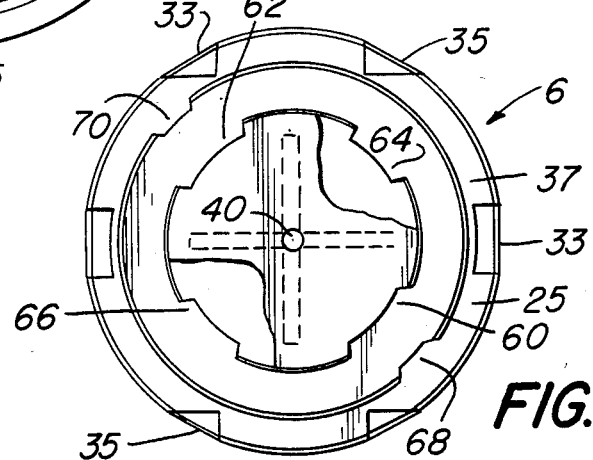

STORAGE BATTERY VENT CAP

BACKGROUND OF THE INVENTION

The present invention relates generally to storage battery ventilation, and more particularly, to an improved vent for use in connection with storage battery designs.

As a result of various chemical processes which occur when storage batteries are in use, as well as during the charging of such storage batteries, gases such as hydrogen and oxygen are often produced. Such gases are generally vented to the atmosphere in order to relieve the battery of internal pressures which would otherwise result. In performing such ventilation, the following two factors should be considered.

First of all, since the gases being vented are hydrogen and oxygen, care must be taken to avoid the possibility of igniting such gases. This is particularly so during battery charging, since gassing becomes more prevalent during such periods, and since electrical connections made to the terminals of the battery can create a potential for sparks. Under such conditions battery damage can result from sparks or ignited gases reentering the battery, at times resulting in battery explosion.

Secondly, care must be taken to prevent the loss of battery electrolyte through the vent, either as a result of misting which occurs in connection with battery gassing, or as a result of battery movement. Those skilled in the art recognize that use of electrolyte preservation venting means reduces the need for additional servicing procedures and often prevents electrolyte loss which may compromise the service life of the battery. However, battery electrolyte levels must be carefully monitored and replenished, as needed.

A variety of devices have been developed in an attempt to accommodate the foregoing by providing a vent cap which improves both safe and reliable in operation, yet inexpensive to manufacture. In an effort to prevent sparks and ignited gases from reentering the battery, many vent caps are generally provided with proportioned apertures or slits which are sufficiently large to enable ventilation of gases from the battery, yet which are sufficiently small to limit the passage of sparks or ignited gases. To reduce the loss of electrolyte, such vent caps are generally provided with baffles or passageways which develop relatively contorted flow paths designed to condense and facilitate the return of electrolyte collected within the vent cap to the cell of the battery with which the vent cap is associated.

U.S. Pat. No. 4,517,262, issued May 14, 1985, to Beidler and commonly assigned, discloses a vent for a storage battery which significantly contributes to the solutions of the problems outlined above. The present invention provides improved solutions by employing a baffle system which enhances electrolyte retention where electrolyte pumping occurs in battery use, and concurrently offers manufacturing feasibility through simplicity of production.

SUMMARY OF THE INVENTION

It is therefore a primary object of the present invention to provide an improved electrolyte retaining vent for use in connection with storage batteries.

It is also an object of the present invention to provide an electrolyte retaining vent cap for a storage battery which is capable of efficiently ventilating gases from the battery to the atmosphere.

Another object of the present invention is to provide a vent cap for a storage battery which is capable of efficiently ventilating gases to the atmosphere, and which is also capable of reducing the possibility of sparks of ignited gases from reentering the storage battery through the vent cap.

Yet another object of the present invention is to provide a vent cap for a storage battery which is capable of condensing and collecting escaping electrolyte, for return to the storage battery, as experienced in electrolyte pumping during battery use.

It is also an object of the present invention to provide a vent cap for a storage battery which is efficient and reliable in operation, yet offers manufacturing feasibility.

These and other objects are achieved in accordance with the present invention by providing a vent cap having a base and cover of improved construction. Terminal portions of the base are provided with a configured channel or groove incorporating a transverse ledge capable of receiving the cover. The cover is provided with a series of ventilating passageways disposed about its periphery, each including a secant-shaped portion provided in the periphery of the cover, and relieved portions provided in the inner and outer face of the cover adjacent to the secant-shaped portions. Upon assembly, the periphery of the cover is located within the channel or groove of the base so that the lower most face of the cover is seated on the transverse ledge.

To promote safety and efficient gas ventilation, the relieved portions combine with the secant-shaped portions of the cover to develop a series of ventilating apertures disposed about the circumference of the resulting assembly, providing a multiplicity of means for effectively ventilating gases in connection therewith. The relieved portions of the cover cooperate with the channel or groove of the base to reduce the possibility of sparks and ignited gases from passing through the assembled vent cap by substantially sealing the ventilating aperture involved as a result of heat produced by the spark or ignited gases.

To promote electrolyte retention, the bottom of the base is provided with an enlarged aperture, and, to promote improved electrolyte retention, the cover is provided with three baffles, surrounding a downwardly depending central stem member, which function to entrap, condense and return electrolyte to the battery. Each of the baffles projects outwardly essentially perpendicularly from the stem member, with the uppermost baffle projecting outwardly a greater distance than the other two baffles and having a top surface which slopes downwardly from the stem member. The diameter of each baffle 27, 28, 29 is from about 95% to about 97% of the interior diameter of the base portion wherein each respective baffle resides, thereby defining respective passageways between the peripheral edges of the baffles and the interior wall of the base portion which inhibit electrolyte passage, but permitting gas passage therethrough. The baffles thus function as barriers to electrolyte escape, as well as means to return electrolyte to the battery.

For further detail regarding the present invention, reference is made to the following detailed description of a preferred embodiment of the invention, taken in conjunction with the following illustrations.

BRIEF DESCRIPTION OF THE DRAWINGS

FIG. 1 is a partial, perspective view illustrating a vent cap according to the invention in combination with a storage battery;

FIG. 2 is an exploded, perspective view of the vent cap illustrated in FIG. 1;

FIG. 3 is a cross-sectional view of the vent cap illustrated in FIG. 1 along line 3—3 thereof;

FIG. 4 is an enlarged, partial cross-sectional view of the area of the vent cap illustrated at IV in FIG. 3;

FIG. 5 is a top plan view of the vent cap illustrated in FIG. 1;

FIG. 6 is a bottom plan view of the cover of the vent cap illustrated in FIG. 1 with portions of the lower baffle broken away; and FIG. 7 is a fragmented sectional view of an alternative embodiment.

DETAILED DESCRIPTION OF A PREFERRED EMBODIMENT

Although specific forms of the invention have been selected for illustration in the drawings, and the following description is drawn in specific terms for the purpose of describing those forms of the invention, this description is not intended to limit the scope of the invention which is defined in the appended claims.

FIG. 1 illustrates a preferred embodiment vent cap 1 produced in accordance with the present invention, enclosing a single filler opening 2 of a storage battery 3. Although not shown, it will be understood that the storage battery 3 may have other filler openings, depending upon the number of cells which the storage battery 3 incorporates, and that each such filler opening may be enclosed by another vent cap of essentially similar construction to the vent cap 1 illustrated in FIG. 1. It will further be understood that although a single vent cap construction has been selected for illustration and description, the present invention will also find applicability in connection with gang vent constructions capable of simultaneously engaging a plurality of filler openings of the storage battery.

With reference to FIGS. 2 and 3, the vent cap 1 generally comprises a base 5 and a cover 6 which are mechanically interconnected to develop a cooperating assembly as will be more fully described below.

The base 5 is generally comprised of three concentric portions, two generally cylindrical portions 7, 8 and a ring portion 12, and two sloping portions or shelves, 9 and 48, not shown. Portions 7 and 8 generally define concentric cylinders which are separated by and interconnected by sloping shelf 9. Portions 8 and 12 are generally concentric with ring 12 being continuous with the outer diameter of portion 8 at the end thereof most remote from portion 7. The lowermost or distal cylindrical portion 7 is provided with an outer diameter which essentially corresponds to the diameter of the filler opening 2 of the storage battery 3. Sloping shelf 48 depends from the distal end 43 of portion 7, see FIG. 3. By establishing a correct tolerance between the cylindrical portion 7 and the filler opening 2, it is possible to provide a press fit vent cap 1 which is capable of frictionally engaging the filler opening 2, if desired. Alternatively, the outer periphery of the cylindrical portion 7 may be provided with threads capable of cooperating with threads associated with the filler opening 2, if desired. Regardless of the configuration used, the interconnection between the cylindrical portion 7 and filler opening 2 should be sufficiently tight to assure a secure assembly. The relationship between the vent cap and the filler opening is known to those skilled in the art. As will be known to those skilled in the art, vent caps such as those of the invention are usually molded of thermoplastic material. In the molding of the cylindrical portion 7, a taper is generally provided as a means of permitting easy introduction of the cap into the fill hole of the battery case. In the present case the taper is typically 1° over the length of cylindrical portion 7, approximately 5/16 of an inch. Since wall thickness is essentially constant the same taper is present on the inner wall 41 of portion 7.

The middle cylindrical portion 8 is provided with a diameter which preferably exceeds the diameter of the cylindrical distal portion 7 as shown in FIG. 2. The outer periphery 10 of the cylindrical portion 8 is preferably provided with a series of ribs 11 which are disposed beneath ring 12 to facilitate engagement and rotation of the base 5 with respect to the filler opening 2, for ease of installation and removal. As seen in FIG. 3, portion 8 extends slightly below shelf 9 and defines circumferential flange and recess area 70. As will be known to those skilled in the art, some designs of filler opening includes a bead area which extends above the surface plane of the cover. Recess area 70, in such embodiments permits full engagement of the vent cap against the bead area.

The proximal cylindrical portion, ring 12, provides a means for engaging the cover 6 of the assembly to the base 5. To this end, ring 12 comprises an outer rim 13 which incorporates an interior recessed vertically positioned wall 14 which extends fully about the inner circumference of the ring 12 to establish an essentially U-shaped receiving cavity 15. The cavity 15 is defined at the distal end by a detent 16 which circumferentially projects from the ring 12, as shown, vertical wall 14 and at the union of portion 8 and ring 12 by a circumferential transverse ledge 17.

The cover member 6 generally includes a disk 25 and three baffles 27, 28, 29 depending from the disk 25. The disk 25 is essentially planar in configuration, having an outer face 36, inner face 37 and a periphery 30 which is capable of cooperating with the rim 13 of the base 5 to provide mechanical interconnection between the base 5 and cover 6. As is best illustrated in FIGS. 2, 3 and 4, the disk 25 is essentially planar, incorporating a chamfered termination at 24, as shown in FIG. 4, and a series of ventilation means 31, as shown in FIG. 2, disposed about the periphery 30 of the disk 25. As shown in FIGS. 2 and 4, each ventilation means 31 takes the form of an aperture 32 defined by a secant-shaped portion 33 spanning a portion of the periphery of the disk 25 in combination with relieved portions 34, 35 formed in the outer face 36 and inner face 37 of the disk 25, respectively, adjacent the secant-shaped portion 33.

With reference to FIGS. 4 and 5, each relief 34 associated with the outer face 36 of the disk 25 is preferably essentially trapezoidal in shape, with its broadest side extending between terminating edges 38 of the secant-shaped portion 33. The remainder of the trapezoidal relief 34 extends inwardly from the periphery of the disk 25, to a position beyond the edge of the detent 16, as well as the edge of the secant-shaped portion 33. With reference to FIGS. 4 and 6, each relief 35 associated with the inner face 37 of the disk 25 also extends from and between the edges 38 of the secant-shaped portion 33, from the chamfer 24 and inwardly along the face 37, to a position beyond the innermost wall 39 of the cylindrical portion 8.

An essentially centrally disposed stem 40 depends from the disk 25, and serves as a means for supporting the baffles 27, 28, 29 beneath the disk 25 as shown in FIG. 3. The first baffle 27 is located at the distal end of the stem 40 and is receivable within the cylindrical portion 7, and projects essentially perpendicularly outwardly from said stem 40. The distal end 43 of the base 5 is provided with sloping shelf member 48 which extends inwardly and downwardly from the cylindrical portion 7 to define a restricted aperture 49 beneath the baffle 27. When cover member 6 and base 5 are assembled, baffle 27 essentially rests on inner surface 48 to define a circular contact area. A restricted passage 18 is defined between the peripheral edge of the baffle 27 and the innermost wall 41 of the cylindrical portion 7. The passage 18 in the embodiment here illustrated is approximately 0.015 inches wide and extends around baffle 27. The diameter of the baffle 27 is equal to about 95.5% of the interior diameter of the cylindrical portion 7.

Spaced above the first baffle 27 on stem 40 is a second baffle 28 having essentially the same dimension as said first baffle 27. The second baffle 28 likewise resides within the cylindrical portion 7 and defines a restricted passage 20 of approximately 0.015 inches wide between its peripheral edge and the wall 41 of said cylinder portion 7. However, it will be recognized that passage 20 can be slightly wider than passage 18 due to molding taper as previously described.

Spaced above the second baffle 28 is a third baffle 29 which projects outwardly a greater distance than the first and second baffles 27, 28. The third baffle 29 fits within the cylindrical portion 8 of the base 5 above shelf member 9 and extends radially from the stem 40 at least beyond the innermost wall 41 and preferably beyond the outer wall of the cylindrical portion 7 to thereby define a restricted passage 21 between its peripheral edge and the innermost wall 39 of the cylinder portion 8. The passage 21 in the embodiment here illustrated is 0.017 inches wide, and the diameter of the baffle 29 is about 96.4% of the interior diameter of the cylindrical portion 8. The top surface of the third baffle 29 slopes downwardly from the stem 40 to encourage any condensed acid to flow back into the battery. A support web 58 can extend from the underside of the disk 25 to the top of the baffle 27. As shown in FIG. 6, wherein the web member 58 is shown in phantom, web members 58 are provided in four locations spaced 90 degrees apart. Web members 58 provide additional condensing surfaces and further restrict the flow of acid containing vapors. In the preferred embodiment the webs 58 extend from the underside of the cap to the top of baffle 27 and define a diameter of approximately 0.5 inches.

With reference to FIGS. 2, 3 and 6, it will be noted that the baffles 27, 28, and 29 are provided with trapezoidal shaped reliefs which are disposed about the respective periphery of the baffle and are 90° apart. With reference to FIGS. 2 and 6, baffle 27 has reliefs 60 and 62, baffle 28 has reliefs 64 and 66 and baffle 29 has reliefs 68 and 70. With respect to placement of the reliefs 60 through 70, FIG. 6 is an accurate representation of the locations as presently preferred, however, FIG. 2 shows the reliefs slightly mispositioned for the purpose of illustration. It is presently preferred that the reliefs 68 and 70 not be positioned directly below secant-shaped portion 33. The reliefs 60 through 70 decrease in size as they approach disk 25. The base of the trapezoid, as defined by a secant on the periphery of the baffle, is typically about 0.250 inches on baffle 27, typically about 0.188 inches on baffle 28 and typically about 0.125 inches on baffle 29. All of the reliefs 60 through 70 have a depth of about 0.04 inches and the side of the trapezoid, if extended inwardly to a meeting point would typically define a right angle.

As illustrated in FIGS. 2 and 3, the distance between the first baffle 28 and second baffle 29 is preferably greater than the distance between the second baffle 29 and the third baffle 30. A space 22 is thus defined between the first and second baffles 27, 28 and is disposed within the cylindrical portion 7 of the base 5. A second space 44 is defined between the second and third baffles 28, 29 and is disposed within the cylindrical portion 8 of the base 5. Finally, a third space 45 is defined between the disk 25 and the third baffle 29.

Assembly of the vent cap 1 is accomplished by urging the cover 6 downwardly to position the periphery 30 of the disk 25 within the cavity 15. The various components comprising the disk 25 and ring 12 combine to develop a snap-fit at this interface. To further facilitate assembly, the exposed face 51 of the detent 16 is provided with a slope which facilitates passage of the periphery 30 beyond the detent 16.

Upon assembly, the outer edge 52 of the disk 25 is placed in contact with the detent 16 of the channel 14, and the lower surface 37 of the disk 25 is placed in contact with transverse face 17 securely retaining and seating the disk 25 in position within the U-shaped cavity 15. The secant-shaped portions 33, in combination with the reliefs 34, 35 associated with each of the ventilation means 31 provided, will automatically develop the apertures 32 used to ventilate gases from the interior of the vent cap 1 to the atmosphere. Likewise, the lower baffle 27 will contact sloping shelf 48, as previously described.

The foregoing assembly serves to reliably and efficiently ventilate gases from the storage battery; in addition it serves to reduce acid pumping under normal condition of use and charging and to reduce the possibility of sparks or ignited gases reentering the storage battery.

For example, the ventilation of gases is enabled through the apertures 32 associated with each of the ventilation means 31. To promote efficient ventilation, a plurality of ventilation means 31 are preferably provided, six regularly spaced ventilation means 31 being shown in the illustrative example. To reduce the possibility of flashback, the apertures 32 are provided with a width which is adequate for gas ventilation, yet which is sufficiently narrow to promote fusion between adjacent portions of the base 5 and cover 6 upon exposure to a spark or ignited gases. In general, widths lying in a range of from no less than 0.003 inches to no more than 0.007 inches are believed to be suitable in this regard. For example, in its preferred embodiment, each relief 34, 35 is separated from adjacent portions of the rim 13 by a spacing of approximately 0.004 inches, while the broadest distance between the face of the secant-shaped portion 33 of the disk 25 and the rim 13 is approximately 0.007 inches. Providing the reliefs 34, 35 with a gap on the order of 0.004 inches has been found to be effective in promoting the fusion of polypropylene parts when exposed to a spark or ignited gases. It will therefore be understood that while the foregoing parameters are considered preferred, variations of these parameters may be deemed necessary for use in connection with some applications, particularly those involving battery constructions comprising different materials.

It will be noted that upon exposure to a spark or ignited gases, while one or more of the ventilation means 31 may be fused closed, other ventilation means 31 provided should remain available to safely vent gases to the atmosphere. However, it is recommended that the vent cap be replaced after any exposure to sparks or possible sources of ignition which might result in fusion of the reliefs 34 and/or 35.

Regarding electrolyte retention, the baffles 27, 28, 29 cooperate to block, collect, condense and return electrolyte during battery operation as follows.

The first baffle 27, with reliefs 60 and 62, operates in connection with the aperture 49, sloping shelf 48 and the restricted passage 18 to provide a first barrier to the escape of splashing or misting electrolyte.

Electrolyte initially contacts baffle 27 which provides a first barrier and condensing surface, however, gasses are still permitted to vent through reliefs 60 and 62 into surrounding passage 18 and space 22. Additional condensing surfaces are provided by ribs 58 and the undesirable baffle 28. Further gas egress is provided through passage 20 and reliefs 64 and 66. Gases are permitted to continue into space 44 where further condensation takes place on the underside of baffle 29. Due to the fact that baffle 29 extends beyond baffle 28 the gases are further slowed by contact with baffle 29 and the additional change in direction. Through passage 21 and reliefs 68 and 70, the gases enter space 45 where further condensation takes place on the underside of disk 25. Ultimate venting to the atmosphere takes place through secant shaped portion 33.

Stated more generally, should electrolyte pass beyond the first baffle 27, it enters the space 22 between the first and second baffles 27, 28, with the second baffle 28 and resultant restricted passage 20 operating as a second barrier to electrolyte escape. Turbulence developed in the space 22 also serves to promote the condensation of electrolyte on the first and second baffles 27, 28 for subsequent return to the battery. Should electrolyte pass beyond the second baffle, however, it enters the space 44 between the second and third baffles 28, 29, with the third baffle 29 and resultant restricted passage 21 operating as a third barrier to electrolyte escape. Turbulence in space 44 also serves to promote the condensation and return of electrolyte to the battery. Finally, in the event that electrolyte does pass beyond the third baffle 29, such electrolyte enters the third space 45 whose floor is the downwardly sloping top surface of the third baffle 29. This sloping top surface returns condensed electrolyte thereon to the battery. Additionally, throughout the vent structure, the return of electrolyte to the battery is promoted by the sloping shelf 9 separating the cylindrical portions 7, 8, as well as the sloping configuration of the member 48 and the enlarged aperture 49. In addition to the foregoing, it will be recalled that web members 58 promote condensation of electrolyte.

With reference to FIG. 7, the conical shaped baffle 72 may replace lower baffle 27 in the previously described arrangement. Use of conical baffle 72 provides additional condensing surface before electrolyte or gasses enter into the vent cap 1.

It will therefore be seen that the vent cap 1 previously described serves well to satisfy each of the objectives previously set forth. It will also be understood that the vent cap 1 described is capable of variation without departing from the spirit and scope of the present invention. For example, as previously indicated, the peripheral configuration of the base 5 may be varied to cooperate with different storage battery constructions, including variations in the cylindrical portion 7, as well as the cylindrical portion 8. Additionally, the present invention will find applicability in connection with gang vent designs, as well as single vent designs. The number of ventilation means 31 provided in connection with the vent cap 1 may also be varied, as may their relative spacing about the periphery 30 of the disk 25.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A vent cap for enclosing a filler opening of a storage battery, comprising:
   (a) a generally cylindrical base portion adapted at a first end thereof to enter into and to engage the filler opening and, terminating at the other end thereof in a rim having a ring including an inwardly disposed, essentially U-shaped cavity, said first end further having an inwardly extending closure member which defines an aperture which is less in diameter than the diameter at said rim, with the cylinder being unrestricted as it extends from said first end toward said rim; and
   (b) a cover portion having a periphery engaging the channel of the base portion and a downwardly depending central stem member having depending therefrom three baffle means each having substantially planar lower surface and projecting outwardly essentially perpendicularly from said stem member and each having a diameter of from about 95% to about 97% of the interior diameter of the base portion wherein each respective baffle means resides, wherein the first baffle means is positioned at essentially the end of the stem member in contact with said base, the second baffle means is positioned a distance above the first baffle means, and the third baffle means is positioned a distance above the second baffle means, with said third baffle means projecting outwardly a greater distance than that of the first and second baffle means and having a top surface which slopes downwardly from said stem member;
   (c) wherein the periphery of the cover portion incorporates an essentially planar face having a chamfered termination and a plurality of circumferentially spaced shaped portions formed therein; and
   (d) wherein the shaped portions cooperate with the channel to develop a plurality of apertures disposed about the interface between the base portion and the cover portion.

2. The vent cap of claim 1 wherein six regularly spaced apertures are developed at the interface.

3. The vent cap of claim 2 wherein a first relieved portion is formed in an outer face of the cover portion, and a second relieved portion is formed in an inner face of the cover portion.

4. The vent cap of claim 2 wherein a pair of members projecting from the ring of the base portion combined to define the channel, and wherein portions of the inner and outer faces of the cover portion adjacent to the relieved portions contact the projecting members.

5. The vent cap of claim 4 wherein the projecting members defining the channel include detent means located at one end of the ring, and a transverse face extending between another end of the ring and the base portion.

6. The vent cap of claim 4 wherein each relieved portion extends along the face of the cover portion to a position beyond the edge of the adjacent, contacted projecting member.

7. The vent cap of claim 6 wherein the relieved portion associated with the lower face of the cover portion extends from chamfered termination of the periphery of the cover portion.

8. The vent cap of claim 6 wherein the relieved portion associated with the upper face of the cover portion is essentially trapezoidal in shape, with its broadest edge spanning the secant-shaped portion.

9. The vent cap of claim 1 wherein the distance between the first and second baffle means is greater than the distance between the second and third baffle means.

10. The vent cap of claim 9 wherein the third baffle means is associated with an enlarged cavity formed in the base portion adjacent to the rim.

11. The vent cap of claim 10 wherein the diameter of the cavity is greater than the diameter of the filler opening engaging portions of the base portion.

12. The vent cap of claim 11 wherein the diameter of the third baffle means is greater than the diameter of the filler opening.

13. The vent cap of claim 11 wherein the cavity is separated from the filler opening engaging portions by a generally downwardly sloping shelf.

14. A vent cap for enclosing a filler opening of a storage battery, comprising:
(a) a generally cylindrical base portion adapted at a first end thereof to enter into and to engage the filler opening and terminating at the other end thereof in a ring including an inwardly disposed, essentially U-shaped channel, said first end further having a closure member which extends inwardly and defines an aperture which is less in diameter than the diameter at said ring, with the cylinder being unrestricted as it extends from said first end toward said ring; and
(b) a cover portion having a periphery engaging the channel of the base portion and a downwardly depending central stem member having depending therefrom three baffle means each having substantially planar lower surfaces and projecting outwardly essentially perpendicularly from said stem member and each having a diameter of from about 95% to about 97% of the interior diameter of the base portion wherein each respective baffle means resides, wherein the first baffle means is positioned at essentially the end of the stem member in contact with said base, the second baffle means is positioned a distance above the first baffle means, and the third baffle means is positioned a distance above the second baffle means, with said third baffle means projecting outwardly a greater distance than that of the first and second baffle means and having a top surface which slopes downwardly from said stem member;
(c) wherein the periphery of the cover portion incorporates an essentially planar face having a chamfered termination and a plurality of circumferentially spaced shaped portions formed therein, wherein the shaped portions formed in the periphery of the cover portion include:
(i) a secant-shaped portion formed in the face of the periphery of the cover portion; and
(ii) a plurality of relieved portions formed in faces of the cover portion adjacent to the secant-shaped portion; and
(d) wherein the shaped portions cooperate with the channel to develop a plurality of apertures disposed about the interface between the base portion and the cover portion.

15. The vent cap of claim 14 wherein the broadest distance between the secant-shaped portion of the cover portion and the ring of the base portion is approximately 0.007 inches.

16. The vent cap of claim 14 wherein the depth of the relieved portions is approximately 0.004 inches.

17. A vent cap for closing a filler opening, comprising:
(a) a base wherein said base further comprises:
(i) a distal portion dimensioned to enter into and mate with the filler opening, said distal portion further comprised of a cylindrical portion and a downwardly depending inwardly sloped surface which extends from a first end of the cylindrical portion and defines an opening less than the diameter of said cylindrical portion;
(ii) an upwardly and outwardly sloped surface extending from the other end of said cylindrical portion;
(iii) mid portion adjacent said upwardly and outwardly sloped surface, concentric with said cylindrical portion and defining a second cylinder of greater diameter than said cylindrical portion;
(iv) a proximal ring adjacent to and surrounding the upper most end of said middle portion, concentric with said cylindrical portion, said proximal ring including an inwardly depending generally U-shaped cavity; and
(b) a cover wherein said cover further comprises;
(i) an upper disk positioned within and in engagement with said U-shaped cavity, said upper disk having a plurality of secant shaped portions disposed about its periphery, said secant shaped portions defining an equal plurality of apertures between said disk and said proximal ring;
(ii) a central stem member depending downwardly from said disk and having at least three concentric, outwardly projecting baffle means having substantially planar lower surfaces spaced along its length, such that the uppermost baffle extends above and over upwardly and outwardly sloped surface of said base with said uppermost baffle having a top surface which slopes downwardly from said central stem member and the remaining baffles are received within the cylindrical portion of said base, each baffle having a diameter of from about 95% to about 97% of the interior diameter of the base portion wherein each baffle means resides and with the lower most baffle in contact with the downwardly depending inwardly sloped surface of said base, said lower most baffle further having at least two generally trapezoid shaped relief means about its periphery, said relief means defining apertures between said lower most baffle and said downwardly depending and inwardly sloped surface.

* * * * *